United States Patent [19]

Heller

[11] 3,877,778
[45] Apr. 15, 1975

[54] APPARATUS FOR ADJUSTING AN OPTICAL OBSERVATION INSTRUMENT
[75] Inventor: Rudolf Heller, Zurich, Switzerland
[73] Assignee: Contraves AG, Zurich, Switzerland
[22] Filed: July 29, 1974
[21] Appl. No.: 492,455

[30] Foreign Application Priority Data
Aug. 17, 1973  Switzerland...................... 11858/73

[52] U.S. Cl................................. 350/25; 350/301
[51] Int. Cl......................... G02b 23/02; G02b 5/08
[58] Field of Search...................... 350/25, 26, 2–24, 350/48–52, 68, 299, 301, 82–85

[56] References Cited
UNITED STATES PATENTS
2,817,994  12/1957  Ehrenhaft et al..................... 350/26
3,383,151  5/1968  Kohler et al......................... 350/48
FOREIGN PATENTS OR APPLICATIONS
2,161,396  7/1972  Germany............................. 350/85

Primary Examiner—Ronald J. Stern
Assistant Examiner—Jon W. Henry
Attorney, Agent, or Firm—Werner W. Kleeman

[57] ABSTRACT

An apparatus for adjusting an optical observation device or instrument, preferably a binocular microscope, the optical component of which is elevationally adjustable at a stationary carrier or support component. At the carrier or support component there are arranged two mirrors or reflectors which successively deflect the field of vision of the observation instrument. One of the reflectors or mirrors is held in an adjustable position at the carrier component and the other reflector or mirror is secured at one end of an adjustment element, the other end of which is constructed as a mouth piece and the hinged mounting of the adjustment element at the support component permits of a random adjustment of the mirror secured to the adjustment element.

3 Claims, 4 Drawing Figures

APPARATUS FOR ADJUSTING AN OPTICAL OBSERVATION INSTRUMENT

BACKGROUND OF THE INVENTION

The present invention relates to a new and improved construction of apparatus for adjusting an optical observation instrument or device, preferably a binocular microscope, the optical component of which is elevationally adjustable at a stationary support or carrier component.

Such type equipment is used when performing work wherein the operator is required to observe the working area under intensified magnification and from different viewing or sighting directions, such as for instance would be the case during the processing or assembly of precision optical or electronic components, or also when carrying out surgical operations, especially brain-, eye-, nose- and ear-surgery. With such type work it is necessary to be able to observe by means of an observation device or instrument, for instance a binocular microscope, each localized point or region of the object within a certain spatial area and from a random viewing direction and also to be able to randomly change the observed localized area as well as the viewing direction, and furthermore, notwithstanding these requirements the performance of the work should never be rendered more difficult or impaired and there should be eliminated the possibility of unintentional readjustment or shifting of the viewing field.

There are already known to the art different constructions of equipment which fulfill the aforementioned purposes and requirements; such equipment has been disclosed, by way of example in Swiss Pat. Nos. 482,439, 526,069 and 535,916 as well as also in U.S. Pat. Nos. 2,967,458 and 3,475,075. Through the use of compensation weights, electromagnet couplings, adjustment motors and the like, with such prior art equipment it is possible to adjust a stand or support for the observation instrument or a supporting portion of the stand by means of hinges or hinge joints in such a way that the observation instrument can be brought into the desired position and direction. The drawback of such equipment resides however in the fact that there is necessary a specially and separate construction of support or stand and which is itself relatively expensive.

SUMMARY OF THE INVENTION

Hence, it is a primary object of the present invention to provide an improved construction of apparatus for adjusting an optical observation instrument which is not associated with the aforementioned limitations of the prior art proposals discussed above.

Another and more specific object of the present invention aims at the provision of a new and improved construction of apparatus for adjusting an optical observation instrument which can be used in combination with simple commercially available stands and observation devices and renders possible that an operator can observe under mangification a random localized area or point within a certain spatial region from a selected sighting or viewing direction as well as being able to vary or alter the localized point or region and the viewing direction as desired in an extremely exact and accurate manner without the need to expend considerable force and without the need to use the hands and/or the feet.

Now in order to implement these and still further objects of the invention, which will become more readily apparent as the description proceeds, the invention contemplates the provision of two reflectors or mirrors which are arranged at the stationary carrier or support component of the observation instrument and which successively deflect its field of vision, the one reflector is fixed in an adjustable position at the carrier component and the other reflector is supported at one end of an adjustment element, the other end of which is constructed as a mouth piece, and the hinged mounting of the adjustment element at the carrier component permits of random adjustment of the reflector secured to the adjustment element.

By means of the apparatus constructed according to the teachings of the invention an operator or user of the device has the possibility, by adjusting the one reflector and moving the other reflector of aligning the field of vision of the observation instrument and its viewing or sighting axis along a random localized point or area and also adjusting the focus. To this end the operator engages the mouth piece between his teeth and with the aid thereof it is possible to adjust the adjustment element with the reflector or mirror secured thereat at the lengthwise direction, the rotational direction as well as the angular position, as required.

According to a preferred manifestation of the invention the apparatus is constructed such that at least one hinge joint of the mounting of the adjustment element is constructed as a ball-and-socket joint; the central portion of the adjustment element is constructed as a substantially straight rod and is guided by a sliding bearing through the ball of the ball-and-socket joint. It is also advantageous to provide a dampening of the movement both at the sliding bearing as well as at the ball-and-socket joint in order to avoid any undesired adjustment of the equipment. This dampening can be realized in conventional manner by the friction in the bearing or the joint, wherein it is also known that the friction can be adjusted with suitable means, for instance by using a knurled head screw, or the movement even completely blocked.

According to a simplified construction of the inventive apparatus, which is preferred when using a horizontally movable stand and observation device, the hinged mounting of the adjustment element possesses a ball-and-socket joint, the adjustment element only being adjustable in angular position, however not being mounted to be adjustable in the lengthwise direction. In this way horizontal forces, exerted by the operator on the mouth piece, are transmitted via the adjustment element and the ball-and-socket joint to the stand and the observation device which then can carry out appropriate movements, whereas the viewing angle adjustment of the observation instrument also can be controlled from the mouth piece and realized by adjusting the angular position of the adjustment element and the reflector or mirror secured thereat.

The hinged mounting can also possess a Cardan joint, wherein however the observation instrument cannot be adjusted with the same extreme precision as when using a ball-and-socket joint.

The mouth piece can be constructed as an electrical switch, by means of which it is possible to electrically activate or control different devices. Thus, for instance, the blocking of the stand hinges and the release thereof by actuating a mouth piece has been disclosed in Swiss patent 535,916, and the control of an adjustment motor for the vertical adjustment of the observation device by actuating a mouth piece and mouth switch has been described in my commonly assigned United States application Ser. No. 475,859, filed June 3, 1974, the disclosure of which is incorporated herein by reference.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
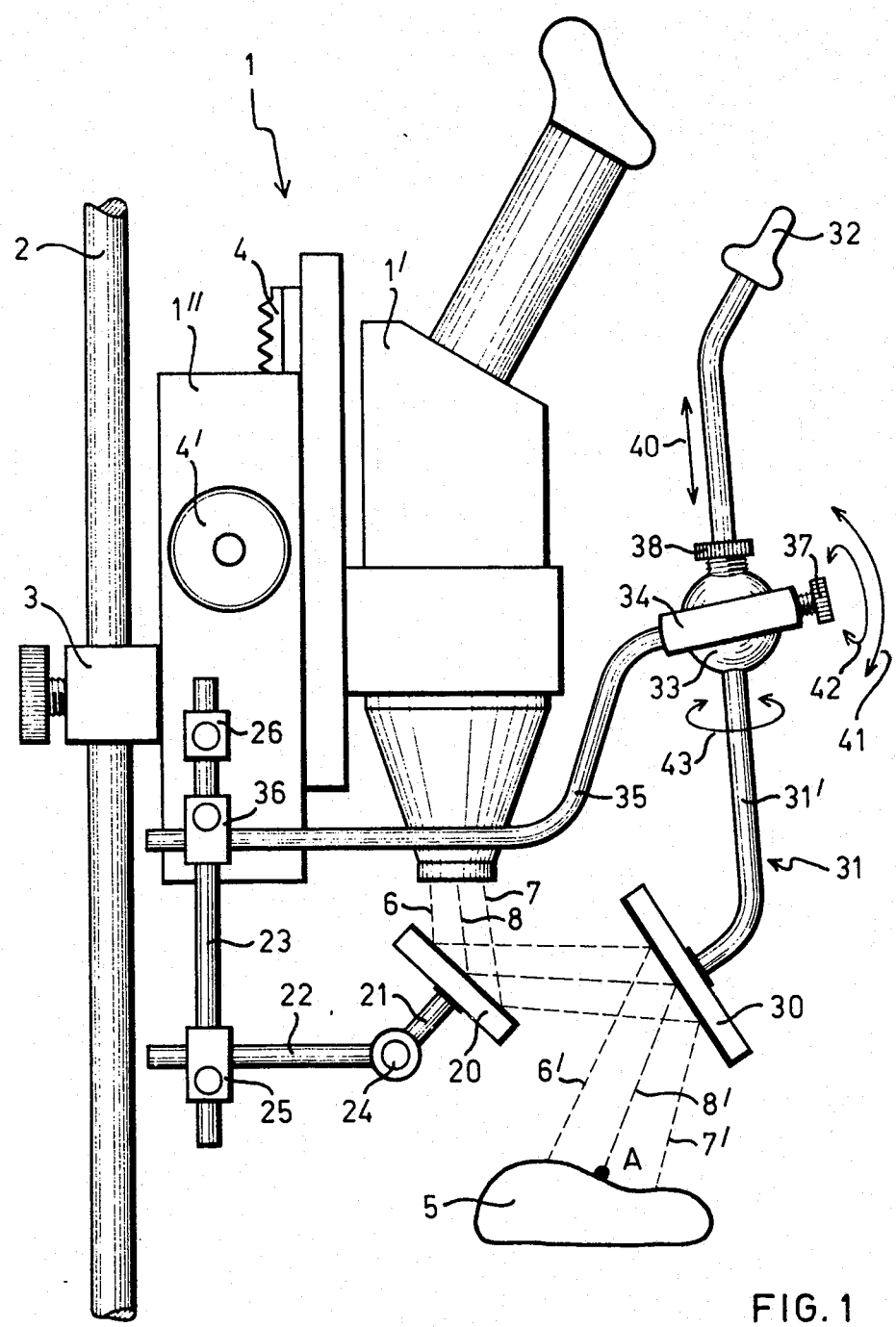
FIG. 1 is a schematic view of apparatus designed according to the teachings of the present invention and used in conjunction with an optical observation instrument, here shown as a binocular microscope by way of example.

Describing now the drawings, in FIG. 1 there is schematically illustrated an optical observation instrument or device, here shown in the form of a binocular microscope 1 composed of an optical component or portion 1' and a support or carrier portion 1". The carrier portion 1" is secured at the supporting component 2 of a not further depicted stand by means of a conventional mounting member 3. The optical component 1' and the carrier or support component 1" of the binocular microscope 1 are interconnected with one another by means of an adjustable gear rack device 4 which renders possible the vertical adjustment of the binocular microscope 1 relative to the stationary supporting portion 2 of the stand by actuating a knurled knob 4' or equivalent structure. The object or subject which is to be observed has been conveniently designated by reference numeral 5.

The boundaries of the field of vision or sighting zone of the binocular microscope 1 have been conveniently designated schematically by the broken lines 6 and 7, the axis of vision or sighting axis of the binocular microscope by the broken line 8.

The reflectors or mirrors 20 and 30 successively deflect the field of vision of the binocular microscope, and specifically in such a manner that after there has been undertaken an adjustment a region or portion of the object 5 which is to be observed is located in a twice deflected field of vision schematically designated by the broken lines 6' and 7' and the double-deflected vision or sighting axis of the object 5, which has been schematically designated by the broken lines 6' and 7' and the double-deflected vision or sighting axis of the object 5, which has been schematically designated by the broken line 8', impinges at a point or location A which is to be observed.

The mirror or reflector 20 is fixedly held through the agency of a rod arrangement 21, 22, 23 and the fixable hinge joints 24, 25, 26 at the carrier component 1", the rods 22 and 23 being rotatable and displaceable in the hinge joints 25 and 26 respectively, and the angle between the rods 21 and 22 is adjustable at the hinge joint 24. The fixing and release of the hinge joints 24, 25, 26 occurs in conventional manner by means of not particularly illustrated knurled head screws or equivalent structure which can be manually actuated.

The mirror or reflector 30 is secured to one end of an adjustment element 31. The other end of the adjustment element 31 carries a mouth piece 32 which can be engaged by the teeth of the operator or user of the equipment when looking through the binocular microscope 1. The central portion 31' of the adjustment element 31 is constructed in the form of a substantially straight rod and can radially slide in a ball 33 of a ball-and-socket joint or ball pivot 34. The ball pivot or ball-and-socket joint 34 is fixedly held by rod arrangement 35, 23 and the fixable hinge joints 26, 36 at the carrier component 1", the rods 35 and 23 being relatively rotatable and displaceable with respect to one another at the hinge joint 36 and such hinge joint 36 can be manually fixed and released in conventional manner by means of a not particularly illustrated knurled head screw or equivalent structure.

The friction of the ball 33 in the ball-and-socket joint 34 is adjusted in known manner by means of a knurled head screw 37 in that the latter, when threaded into the ball-and-socket joint 34, tensions a spring therein, which in turn controls the friction of the ball 33 in the ball-and-socket joint 34. In equally conventional manner the friction of the adjustment element 31 in the ball 33 is adjusted by a further knurled head screw 38 in that the latter possesses an axial bore through which there is piercingly guided the adjustment element 31 and upon threading into the ball 33 presses against an elastic ring which in turn controls the friction of the adjustment element 31 in the ball 33.

In this way it is possible to randomly adjust the position of the ball-and-socket joint 34 with respect to the binocular microscope over a certain spatial region, and the adjustment element 31 at the ball-and-socket joint 34 can carry out relative to the binocular microscope 1 random sliding- and rotational movements, which have been conveniently indicated by the arrow 40 for the sliding direction and by the arrows 41, 42, 43 for the rotational directions. These movements of the adjustment element 31 are produced by the operator by biting and moving the mouth piece 32 and are transmitted from the adjustment element 31 to the reflector or mirror 30 which deflects the field of vision or sighting field of the binocular microscope.

The described apparatus renders possible for an operator, when using a standard stand and observation instrument, to adjust or change the local point or area which is being observed as well as the sighting direction in which the observation of such local area is undertaken, and specifically throughout all those spatial regions where the viewing or sighting field of the observation instrument can be deflected to the desired localized point or region A. With a slight change of the observed local point the image sharpness or focus is hardly impaired, and the tolerance with respect to the focus is in an inverse relationship to the intensity of the magnification. In the aforementioned tolerance range it is possible for an operator to carry out the desired adjustment or change with precision, without the need to expend any considerable amount of force and without the need to use the hands or the feet. In the event that the tolerance is exceeded then the focus can again be reestablished by carrying out readjustments at the gear rack device, and specifically either manually as in the described embodiment of the invention, or by the use of motive power which can be controlled from a switch in the mouth piece, as disclosed in my aforementioned copending commonly assigned United States application Ser. No. 475,859, filed June 3, 1974.

Figure 2:
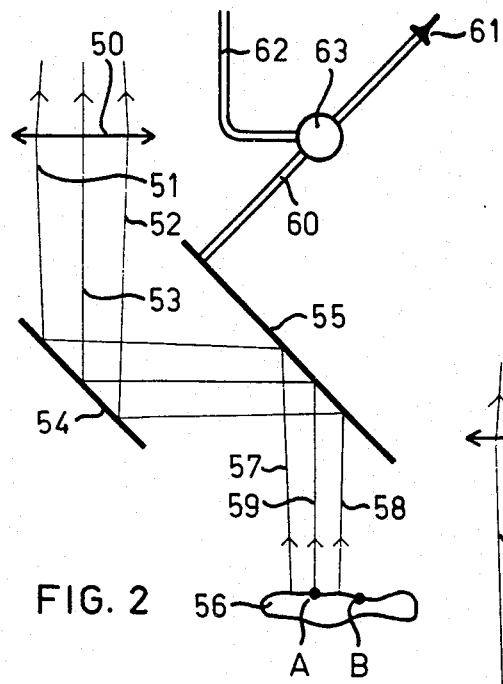
FIGS. 2, 3 and 4 respectively schematically show the path of the light rays for three different possibilities of adjusting the binocular microscope with respect to the observed object.
Figure 3:
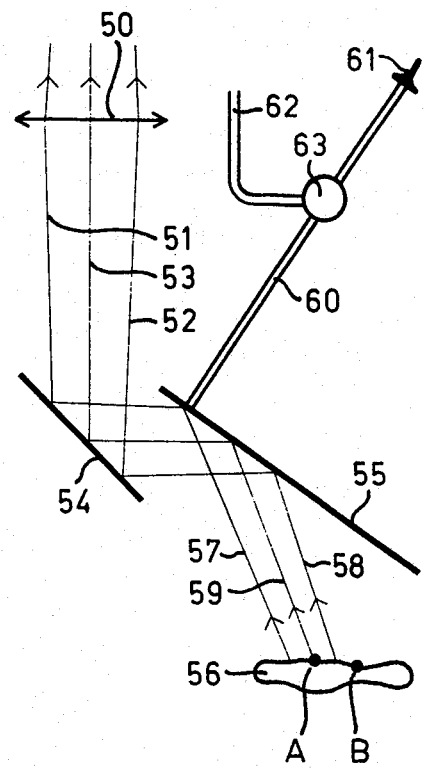
Figure 4:
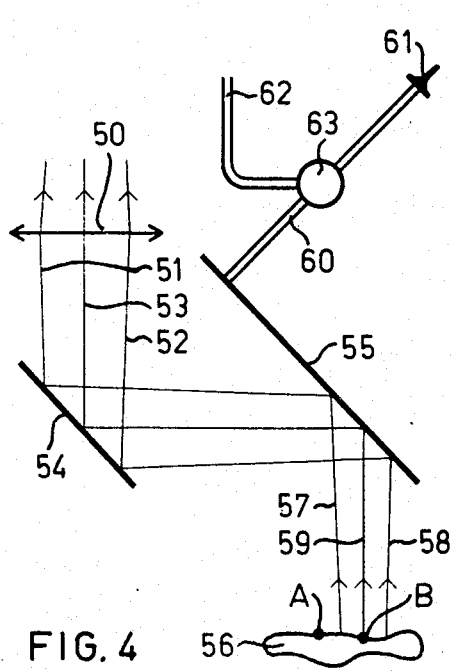

In FIGS. 2, 3 and 4 there is schematically depicted the binocular microscope by means of its objective lens 50. The field of vision bounded by the lines 51 and 52 and the viewing axis 53 are deflected by the mirrors or deflectors 54 and 55, so that a portion of the object 56 to be observed, after undergoing a two-fold deflection or reflection, comes to lie in the field of vision bounded by the lines 57 and 58. The two-fold reflected viewing axis 59 impinges at the object 56, and specifically in the arrangement of FIGS. 2 and 3 and at the point A and in the arrangement of FIG. 4 at the point B.

The reflector or mirror 54 is fixedly held in not particularly illustrated manner and this is also the case for the object 56. The reflector or mirror 55 is secured to one end of its schematically depicted adjustment element 60, the other end of which carries the mouth piece 61. The adjustment element 60 can randomly move relative to a stationary rod 62 by virtue of the hinge joint 63 which, for instance, consists of the previously described ball-and-socket joint having a radial sliding bearing.

As will be apparent from a comparison of FIGS. 2, 3 and 4 the reflector or mirror 55 can be adjusted in elevation and in angular position in order to permit the object 56 to be impinged at a random point by the sighting or viewing axis 59, for instance at the point A in FIGS. 2 and 3 and at the point B in FIG. 4, wherein FIGS. 2 and 3 the viewing or sighting axis 59 impnges from different sighting directions at the same point A. The binocular microscope 50 can be adjusted in elevational direction in order to always be able to readjust the proper focus; as already mentioned this readjustment of the binocular microscope is not necessary in many instances.

Of course, the movable reflector 30 in FIG. 1 and the movable reflector 55 in FIG. 2 can be adjusted such that the viewing axis 8, 8' in FIG. 1 and the viewing axis 59 in FIG. 2 do not extend in a plane, so that the operator can adjust the field of vision of the binocular microscope forwardly, rearwardly, as well as laterally.

While there is shown and described present preferred embodiments of the invention, it is to be distinctly understood that the invention is not limited thereto, but may be otherwise variously emobdied and practiced within the scope of the following claims.

Accordingly, what is claimed is:

1. An apparatus for adjusting an optical observation instrument having an optical component elevationally adjustable at a stationary carrier component, the improvement comprising two reflectors supported at the carrier component for successively deflecting the field of vision of the observation instrument, means for retaining the one reflector in an adjustable position at the carrier component, an adjustment element having a first end and a second end, the other reflector being secured at the first end of the adjustment element, the other end of said adjustment element being constructed as a mouth piece, and means for hingedly mounting the adjustment element at the carrier component for enabling a random adjustment of the reflector secured at the adjustment element, the mouth piece being spaced from said optical observation instrument for engagement by a person's mouth whereby said other reflector can be adjusted by movement of the mouthpiece to vary the field of view simultaneously observed by the person through said optical observation instrument.

2. The apparatus as defined in claim 1, wherein at least one of the mounting means for the adjustment element is constructed as a hinge joint in the form of a ball-and-socket joint.

3. The apparatus as defined in claim 2, wherein the adjustment element has a central portion constructed as a substantially straight rod which is guided by a ball of the ball-and-socket joint.

* * * * *